United States Patent [19]

Komorita et al.

[11] 4,120,732
[45] Oct. 17, 1978

[54] OPTICAL GLASS

[75] Inventors: Fujio Komorita, Hachioji; Muneo Nakahara, Sagamihara, both of Japan

[73] Assignee: Kabushiki Kaisha Ohara Kogaku Garasu Seizosho, Sagamihara, Japan

[21] Appl. No.: 860,024

[22] Filed: Dec. 12, 1977

[51] Int. Cl.² ............................ C03C 3/12; C03C 3/14
[52] U.S. Cl. ..................................... 106/47 Q; 106/54
[58] Field of Search ............................... 106/47 Q, 54

[56] References Cited

U.S. PATENT DOCUMENTS 3,958,999  5/1976  Izumitani et al. ................. 106/47 Q Primary Examiner—O. R. Vertiz
Assistant Examiner—Mark Bell
Attorney, Agent, or Firm—Ladas, Parry, Von Gehr, Goldsmith & Deschamps

[57] ABSTRACT

An optical glass consisting essentially of a $B_2O_3$—$La_2O_3$—$Gd_2O_3$—$WO_3$—$ZrO_2$ and/or $Ta_2O_5$ system has high refractive and low dispersive characteristics with optical constants of 1.85–1.96 for Nd and 43–28 for νd, is free of poisonous $ThO_2$, CdO and BeO ingredients, and suitable for mass production.

2 Claims, No Drawings

OPTICAL GLASS

BACKGROUND OF THE INVENTION

This invention relates to an optical glass and, more particularly, to a high refractive and low dispersive optical glass having optical constants of 1.85 – 1.96 for Nd and 43–28 for $vd$ and consisting of a $B_2O_3$—$La_2O_3$—$Gd_2O_3$—$WO_3$—$ZrO_2$ and/or $Ta_2O_5$ system which is free of poisonous oxides such as $ThO_2$, CdO and BeO and sufficiently stable to devitrification.

Various high refractive and low dispersive optical glasses containing the poisonous ingredients such as $ThO_2$, CdO and BeO have hitherto been reported and attempts have been made to improve these optical glasses and make them harmless to humans, as disclosed in British Pat. No. 1183996, Japanese Laid-open Patent Publication Nos. 37410/1973 and 55705/1974. These improved optical glasses, however, cannot achieve a high refractivity and a low dispersion observed in the optical glasses before the improvement was made. Further, optical glasses of higher optical properties have a greater tendency to devitrification and are not suitable for mass production.

SUMMARY OF THE INVENTION

It is, therefore, an object of the present invention to eliminate the above described disadvantages of the prior art optical glasses by providing a novel high refractive, low dispersive optical glass free of the poisonous oxides.

Concentrated studies and repeated experiments made by the inventors of the present invention have resulted in a finding that the above object can be attained and a high refractive and low dispersive optical glass of 1.85 – 1.96 for Nd and 43 – 28 for $vd$ can be obtained by using an optical glass of a $B_2O_3$ — $La_2O_3$ — $Gd_2O_3$ — $WO_3$ — $ZrO_2$ and/or $Ta_2O_5$ system whose research data has hitherto been quite unknown.

According to the present invention, there is provided an optical glass containing a relatively small amount of $B_2O_3$, a relatively large amount of $La_2O_3$, an amount of a relatively wide range of $Gd_2O_3$ and $WO_3$, a proper amount of $ZrO_2$ and/or $Ta_2O_5$, and having the desired optical properties and stability. The optical glass according to the invention consists of a composition in weight percent of 10 to less than 17% $B_2O_3$, 20 to 55% $La_2O_3$, 0.5 to 38% $Gd_2O_3$, 0.5 to 32% $WO_3$, 0 to 10% $ZrO_2$, 0 to 30% $Ta_2O_5$, the total of said $ZrO_2$ and $Ta_2O_5$ being 2 to 35%, 0 to 5.5% $SiO_2$, 0 to 5% $GeO_2$, 0 to 16% $Y_2O_3$, 0 to 5% $Tb_4O_7$, 0 to 38% $Yb_2O_3$, the total of said $Y_2O_3$, $Tb_4O_7$ and $Yb_2O_3$ being 0 to 40%, 0 to less than 2% $TiO_2$, 0 to 31% $Nb_2O_5$, 0 to 3% $SnO_2$, 0 to 5% $Al_2O_3$ 0 to 5% $In_2O_3$, 0 to 5% $Bi_2O_3$ and one or more oxides selected from the group consisting of MgO, CaO, SrO, BaO, ZnO and PbO, the amount of or the total amount of said MgO, CaO, SrO, BaO, ZnO and PbO being 0 to less than 2%.

DETAILED DESCRIPTION OF THE INVENTION

In the optical glass made according to the present invention, the above mentioned composition is selected for reasons stated below.

If the content of $B_2O_3$ is less than 10%, a devitrification tendency considerably increases and mass production of the optical glass becomes difficult whereas if the content of $B_2O_3$ exceeds 17%, the desired optical properties cannot be obtained.

$La_2O_3$ is an essential ingredient for producing a high refractive and low dispersive optical glass and at least 20% of the $La_2O_3$ content is required for satisfying the optical properties of the optical glass according to the present invention. If, however, the content of $La_2O_3$ exceeds 55%, the devitrification tendency increases and a stable glass cannot be produced.

$Gd_2O_3$ which provides the glass with optical properties similar to those provided by $La_2O_3$ is necessary for preventing devitrification and maintaining stability required for achieving mass production of the optical glass. If the content of $Gd_2O_3$ is less than 0.5%, such effects are reduced whereas if the content of $Gd_2O_3$ exceeds 38%, phase separation occurs with a resulting difficulty in obtaining a homogeneous optical glass.

$WO_3$ is an important ingredient which has been found to be capable of being contained in a fairly wide content range for increasing the refractive index and preventing devitrification. If the content of $WO_3$ is less than 0.5%, such effects can scarcely be obtained whereas increasing the content of $WO_3$ above 32% increases tinting of the glass to an undesirable degree.

$ZrO_2$ contributes to preventing devitrification and is also effective for increasing the refractive index as compared with $La_2O_3$. If, however, the content of $ZrO_2$ exceeds 10%, the devitrification tendency increases instead of decreases.

$Ta_2O_5$ provides the glass with substantially the same refractive index as $La_2O_3$ and, if the content of $Ta_2O_5$ is up to 30%, it contributes to making an optical glass which is stable to devitrification. If the content of $Ta_2O_5$ exceeds 30%, the quantity of insoluble matters in the melt increases resulting in difficulty in making a homogeneous optical glass.

In the optical glass made according to the present invention, introduction of $ZrO_2$ and/or $Ta_2O_5$ as an ingredient is essential for preventing the devitrification tendency as well as maintaining the desired optical properties. If the sum of $ZrO_2$ and/or $Ta_2O_5$ is less than 2%, sufficient effects of these ingredients cannot be expected whereas if the sum exceeds 35%, the glass becomes hard to melt and the tendency to devitrification increases.

Ingredients to be described below are not essential ingredients for the optical glass according to the invention but they are effective for correcting the optical properties of the glass and preventing the devitrification tendency further if they are used within their proper content ranges.

$SiO_2$ and $GeO_2$ are effective for increasing viscosity of the molten glass and thereby preventing devitrification. If the content of $SiO_2$ exceeds 5.5%, the quantity of insoluble matters in the melt increases resulting in difficulty in obtaining a homogeneous optical glass. If the content of $GeO_2$ increases above 5%, the devitrification tendency increases, instead of decreases so that a stable glass cannot be obtained.

$Y_2O_3$, $Tb_4O_7$ and $Yb_2O_3$ are similar to $La_2O_3$ in their effects on the optical glass made according to the present invention and are effective for preventing devitrification if the content of $Y_2O_3$ is up to 16%, that of $Tb_4O_7$ is up to 5% and that of $Yb_2O_3$ is up to 38%, respectively. However, the devitrification tendency does not decrease, but on the contrary increases, if the contents of $Y_2O_3$ and $Yb_2O_3$ exceed the above mentioned amounts, so that a stable glass cannot be obtained. Increasing of the content of $Tb_4O_7$ above the above mentioned amount is undesirable because the glass is tinted.

Further, if the sum of the contents of $Y_2O_3$, $Tb_4O_7$ and $Yb_2O_3$ exceeds 40%, the devitrification tendency increases and the glass is likely to become unstable.

$TiO_2$ and $Nb_2O_5$ are effective for increasing the refractive index and preventing devitrification. If, however, the content of $TiO_2$ exceeds 2%, the glass is tinted to an undesirable degree. If the content of $Nb_2O_5$ exceeds 31%, the devitrification tendency sharply increases.

$SnO_2$ is effective for preventing devitrification but increasing the content thereof above 3% increases tinting of the glass to an undesirable degree.

$Al_2O_3$ is effective for increasing viscosity of the molten glass, preventing devitrification and preventing phase separation which occurs due to $Gd_2O_3$. Increasing the content of $Al_2O_3$ above 5%, however, increases the devitrification tendency.

$In_2O_3$ and $Bi_2O_3$ are effective for increasing the refractive index and preventing devitrification. If, however, the content of each of these ingredients exceeds 5%, tinting of the glass increases to an undesirable degree.

MgO, CaO, SrO, BaO, ZnO and PbO may effectively be used as melting agents for melting the $SiO_2$ material. If, however, the amount of or the total amount of one or more of these ingredients exceeds 2%, the devitrification tendency increases.

One or more of the above described oxide glass ingredients, e.g., $Y_2O_3$, $Al_2O_3$ and MgO, may be replaced, in part or in whole, with fluorides such as $YF_3$, $AlF_3$ and $MgF_2$ for further facilitating melting of the glass and preventing devitrification. The content of fluorine in the glass should preferably be held within a range not exceeding 2%.

Examples of the composition (in weight percent) of the optical glass according to the invention as well as optical properties (Nd, νd) and liquidus temperatures (° C) thereof are shown in Table 1. In these examples, the liquidus temperatures were obtained by maintaining a glass grain of about 1 mm in a temperature gradient furnace for 30 minutes and thereafter observing the glass sample.

As will be apparent from the Table, these examples of the optical glass all possess high refractive and low dispersive characteristics. Further, as will also be apparent from the liquidus temperatures in the Table, the optical glass is sufficiently stable to devitrification. Since these optical glasses contain a relatively small amount of $B_2O_3$, they are higher in viscosity in melting than conventional optical glasses containing $B_2O_3$ and $La_2O_3$ and, accordingly, require a relatively high melting temperature (1340°–1420° C). These optical glasses, however, can be readily manufactured by melting the raw materials in a platinum crucible or the like, refining and stirring the melt to homogenize it and thereafter pouring it in a mould and annealing it.

Table 1 - 1

| No. | $B_2O_3$ | $La_2O_3$ | $Gd_2O_3$ | $WO_3$ | $ZrO_2$ | $Ta_2O_5$ | $SiO_2$ | $Y_2O_3$ | | | | Nd | νd | Liquidus temperature (° C) |
|---|---|---|---|---|---|---|---|---|---|---|---|---|---|---|
| 1 | 16.3 | 38.4 | 9.6 | 1.4 | 5.0 | 15.7 | 5.0 | 8.6 | | | | 1.8538 | 42.6 | 1160 |
| 2 | 11.0 | 38.0 | 3.0 | 13.5 | 4.5 | 15.0 | 3.0 | 12.0 | | | | 1.9193 | 36.0 | 1200 |
| 3 | 16.9 | 41.1 | 4.0 | 15.0 | 4.0 | 19.0 | | | | | | 1.8932 | 36.5 | 1150 |
| 4 | 14.0 | 28.0 | 30.0 | 5.0 | 6.0 | 14.0 | 3.0 | | | | | 1.9013 | 37.6 | 1160 |
| 5 | 14.0 | 24.0 | 1.0 | 13.0 | 6.0 | 26.0 | | 16.0 | | | | 1.9178 | 30.1 | 1170 |
| 6 | 15.0 | 55.0 | 0.5 | 5.0 | | 24.5 | | | | | | 1.9083 | 35.4 | 1160 |
| 7 | 10.5 | 25.0 | 26.0 | 30.0 | | 6.0 | 2.5 | | | | | 1.9128 | 34.1 | 1145 |
| 8 | 16.0 | 39.0 | 1.0 | 14.0 | | 30.0 | | | | | | 1.8894 | 31.0 | 1150 |
| 9 | 15.0 | 30.0 | 20.0 | 0.5 | 7.0 | 27.5 | | | | | | 1.9147 | 34.8 | 1180 |
| 10 | 10.0 | 34.5 | 15.0 | 15.0 | 4.0 | 17.0 | 4.5 | | | | | 1.9166 | 36.0 | 1190 |
| 11 | 14.0 | 40.0 | 1.0 | 10.0 | 7.0 | 28.0 | | | | | | 1.9218 | 30.5 | 1140 |
| 12 | 16.0 | 20.0 | 38.0 | 5.0 | 6.0 | 15.0 | | | | | | 1.9103 | 37.4 | 1190 |
| 13 | 14.0 | 20.0 | 1.5 | 10.0 | 3.0 | 11.0 | 3.0 | | $Yb_2O_3$ 37.5 | | | 1.8802 | 36.1 | 1180 |
| 14 | 16.5 | 21.0 | 0.5 | 5.0 | 3.0 | 15.0 | | 12.0 | $Yb_2O_3$ 24.0 | $Tb_4O_7$ 3.0 | | 1.8945 | 37.0 | 1195 |
| 15 | 15.0 | 36.0 | 4.0 | 32.0 | 2.0 | | 4.0 | | | | $Nb_2O_5$ 7.0 | 1.8633 | 32.1 | 1130 |
| 16 | 16.6 | 31.0 | 9.4 | 6.9 | 3.4 | 9.3 | 3.0 | 5.4 | | | $Nb_2O_5$ 10.0, $YF_3$ 5.0 | 1.8843 | 29.1 | 1120 |

Table 1 - 2

| No. | $B_2O_3$ | $La_2O_3$ | $Gd_2O_3$ | $WO_3$ | $ZrO_2$ | $Ta_2O_5$ | $SiO_2$ | $Y_2O_3$ | Other | Nd | νd | Liquidus temperature (° C) |
|---|---|---|---|---|---|---|---|---|---|---|---|---|
| 17 | 13.0 | 41.5 | 1.5 | 20.0 | 3.5 | 17.0 | | 2.0 | $TiO_2$ 1.5 | 1.9402 | 33.2 | |
| 18 | 16.7 | 33.0 | 2.0 | 5.3 | 3.5 | 8.5 | | | $Nb_2O_5$ 31.0 | 1.9582 | 28.0 | 1080 |
| 19 | 12.0 | 31.0 | 6.0 | 25.0 | | 18.0 | | | $GeO_2$ 5.0, $SnO_2$ 3.0 | 1.9098 | 32.2 | 1085 |
| 20 | 12.0 | 45.0 | 1.0 | 17.0 | 4.0 | 14.0 | 2.0 | | $Al_2O_3$ 5.0 | 1.8720 | 36.4 | 1110 |
| 21 | 14.0 | 33.0 | 7.0 | 23.0 | 3.0 | 15.0 | | | $In_2O_3$ 5.0 | 1.9178 | 32.8 | 1080 |
| 22 | 14.0 | 34.0 | 5.0 | 21.0 | 4.0 | 17.0 | | | $Bi_2O_3$ 5.0 | 1.9254 | 29.3 | 1045 |
| 23 | 16.4 | 36.0 | 2.0 | 18.5 | 3.5 | 17.5 | 4.6 | | SrO 1.5 | 1.8502 | 31.2 | 1050 |
| 24 | 15.3 | 40.0 | 2.0 | 17.5 | 3.0 | 16.2 | 3.8 | | $MgF_2$ 2.2 | 1.8651 | 32.3 | 1080 |
| 25 | 16.0 | 30.0 | 10.0 | 20.0 | 10.0 | 2.0 | 4.0 | 8.0 | | 1.8666 | 34.9 | |
| 26 | 14.5 | 30.0 | 26.5 | 5.0 | 6.0 | 12.5 | 5.5 | | | 1.8586 | 41.7 | 1150 |
| 27 | 16.0 | 30.0 | 15.0 | 12.5 | 5.0 | 15.0 | 5.0 | | CaO 1.5 | 1.8571 | 35.5 | |
| 28 | 14.0 | 35.0 | 7.0 | 17.0 | 5.5 | 15.0 | 5.0 | | BaO 1.5 | 1.8727 | 32.7 | 1090 |
| 29 | 15.0 | 29.0 | 27.0 | 3.5 | 6.0 | 13.0 | 5.0 | | ZnO 1.0 | 1.8591 | 41.8 | 1140 |

Table 1 - 2-continued

| No. | $B_2O_3$ | $La_2O_3$ | $Gd_2O_3$ | $WO_3$ | $ZrO_2$ | $Ta_2O_5$ | $SiO_2$ | $Y_2O_3$ | PbO | Nd | νd | Liquidus temperature (° C) |
|---|---|---|---|---|---|---|---|---|---|---|---|---|
| 30 | 12.1 | 39.0 | 4.0 | 14.5 | 6.0 | 15.5 | 3.0 | 4.0 | 1.9 | 1.9101 | 35.3 | |
| 31 | 13.5 | 32.0 | 27.0 | 4.5 | 5.0 | 14.0 | 4.0 | | | 1.8811 | 40.9 | |

What is claimed is:

1. An optical glass consisting of a composition in weight percent of 10 to less than 17% $B_2O_3$, 20 to 55% $La_2O_3$, 0.5 to 38% $Gd_2O_3$, 0.5 to 32% $WO_3$, 0 to 10% $ZrO_2$, 0 to 30% $Ta_2O_5$, the total of said $ZrO_2$ and $Ta_2O_5$ being 2 to 35%, 0 to 5.5% $SiO_2$, 0 to 5% $GeO_2$, 0 to 16% $Y_2O_3$, 0 to 5% $Tb_4O_7$, 0 to 38% $Yb_2O_3$, the total of said $Y_2O_3$, $Tb_4O_7$, and $Yb_2O_3$ being 0 to 40%, 0 to less than 2% $TiO_2$, 0 to 31% $Nb_2O_5$, 0 to 3% $SnO_2$, 0 to 5% $Al_2O_3$, 0 to 5% $In_2O_3$, 0 to 5% $Bi_2O_3$, and an oxide or oxides selected from the group consisting of MgO, CaO, SrO, BaO, ZnO and PbO, the amount of or the total amount of said MgO, CaO, SrO, BaO, ZnO and PbO being 0 to less than 2%.

2. The optical glass according to claim 1 which includes a fluoride or fluorides in substitution, in part or in whole, for the oxide or oxides of the same element or elements as said fluoride or fluorides among the ingredients of said composition, the total amount of fluorine contained in said fluoride or fluorides being in a proportion of up to 2% by weight.

* * * * *